(12) United States Patent
Nakamura

(10) Patent No.: US 10,887,488 B2
(45) Date of Patent: Jan. 5, 2021

(54) READING APPARATUS AND NON-TRANSITORY COMPUTER-READABLE STORAGE MEDIUM STORING PROGRAM FOR INCLINATION CORRECTION OF DOCUMENT IMAGE

(71) Applicant: SEIKO EPSON CORPORATION, Tokyo (JP)

(72) Inventor: Tomohiro Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/558,394

(22) Filed: Sep. 3, 2019

(65) Prior Publication Data

US 2020/0076976 A1 Mar. 5, 2020

(30) Foreign Application Priority Data

Sep. 5, 2018 (JP) ................................. 2018-166346

(51) Int. Cl.
*H04N 1/38* (2006.01)
*H04N 1/387* (2006.01)

(52) U.S. Cl.
CPC ......... *H04N 1/3878* (2013.01); *H04N 1/3873* (2013.01); *H04N 1/3877* (2013.01)

(58) Field of Classification Search
CPC combination set(s) only.
See application file for complete search history.

(56) References Cited

U.S. PATENT DOCUMENTS

2017/0366705 A1* 12/2017 Wada ...................... G06T 5/006

FOREIGN PATENT DOCUMENTS

JP 2016-192678 A 11/2016

* cited by examiner

*Primary Examiner* — Barbara D Reinier
(74) *Attorney, Agent, or Firm* — Global IP Counselors, LLP

(57) ABSTRACT

A reading apparatus includes: a reading unit reading a document; a determination unit determining whether or not inclination correction of a document image is performed based on a shape of a circumscription image which is a circumscribed rectangle of the document image read from the document; and an output unit outputting an image according to a determination result.

7 Claims, 8 Drawing Sheets

FIG. 6

| | NUMBER OF SIDE IMAGES IN WHICH SIDE INCLINATION IS SAME AS DOCUMENT INCLINATION | | | |
|---|---|---|---|---|
| | 4 | 3 | 2 OR LESS | |
| | | | FACING TWO LONG SIDES ARE SAME | OTHERS |
| NON-LONG DOCUMENT | CORRECT | CORRECT | NOT CORRECT | NOT CORRECT |
| LONG DOCUMENT | CORRECT | CORRECT | NOT CORRECT | NOT CORRECT |
| LENGTHY DOCUMENT | CORRECT | CORRECT | CORRECT | NOT CORRECT |

FIG. 10
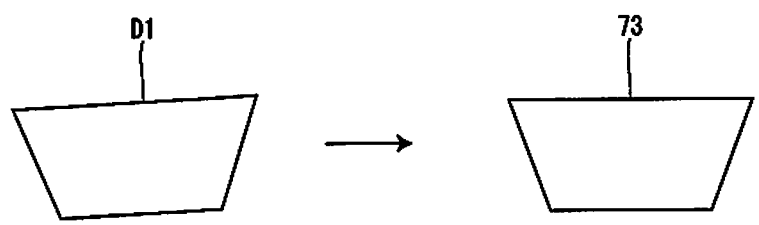
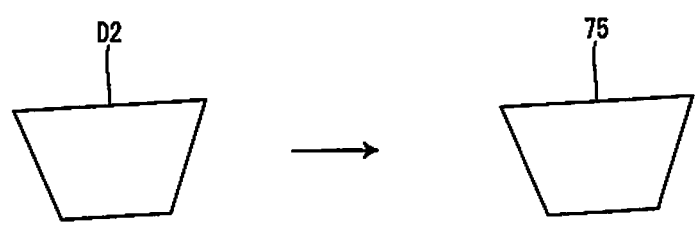

READING APPARATUS AND NON-TRANSITORY COMPUTER-READABLE STORAGE MEDIUM STORING PROGRAM FOR INCLINATION CORRECTION OF DOCUMENT IMAGE

The present application is based on, and claims priority from JP Application Serial Number 2018-166346, filed Sep. 5, 2018, the disclosure of which is hereby incorporated by reference herein in its entirety.

BACKGROUND

1. Technical Field

The present disclosure relates to a reading apparatus reading a document and a non-transitory computer-readable storage medium storing a program.

2. Related Art

In the related art, an image reading apparatus which performs a rotation correcting process under a condition that inclination angles of a front edge, a left edge, and a right edge of a document image region to be read from a document almost coincide with each other is known as disclosed in JP-A-2016-192678.

Further improvement of a condition whether or not rotation correction is performed, for example, rotation correction of a document, the document being desired to be subjected to the rotation correction, is not performed without satisfying a condition of JP-A-2016-192678, has been required.

SUMMARY

A reading apparatus according to an aspect of the present disclosure includes: a reading unit reading a document; a determination unit determining whether or not inclination correction of a document image is performed based on a shape of a circumscribed rectangle of the document image read from the document; and an output unit outputting an image subjected to the inclination correction for the document image when it is determined that the inclination correction is performed, and outputting an image not subjected to the inclination correction for the document image when it is determined that the inclination correction is not performed.

A non-transitory computer-readable storage medium according to an aspect of the present disclosure stores a program, the program causing a computer to function as: a determination unit determining whether or not inclination correction of a document image is performed based on a shape of a circumscribed rectangle of the document image read from the document by a reading unit; and an output unit outputting an image subjected to the inclination correction for the document image when it is determined that the inclination correction is performed, and outputting an image not subjected to the inclination correction for the document image when it is determined that the inclination correction is not performed.

A reading apparatus according to an aspect of the present disclosure includes: a reading unit reading a document; and a control unit outputting an output image based on the document image read from the document, in which the control unit outputs a first output image subjected to correcting an inclination of a first document image read from a first document as the output image when the first document is read, and the control unit outputs a second output image not subjected to correcting an inclination of a second document image read from a second document as the output image when the second document in which all angles of vertices corresponding to the first document coincide those of the first document and a shape is different from that of the first document is read.

A non-transitory computer-readable storage medium according to an aspect of the present disclosure stores a program, the program causing a computer to function as: a control unit outputting an output image based on a document image read from a document by a reading unit, in which the control unit outputs a first output image subjected to correcting an inclination of a first document image read from a first document as the output image when the first document is read, and the control unit outputs a second output image not subjected to correcting an inclination of a second document image read from a second document as the output image when the second document in which all angles of vertices corresponding to the first document coincide with those of the first document and a shape is different from that of the first document is read.

BRIEF DESCRIPTION OF THE DRAWINGS

FIG. 6 is a view showing whether or not inclination correction is performed depending on the number of side images in which a side inclination is the same as a document inclination and a shape of a document.

FIG. 10 is a view showing other examples of the first document and the second document.

DESCRIPTION OF EXEMPLARY EMBODIMENTS

Hereinafter, embodiments of a reading apparatus will be described with reference to the accompanying drawings.

Figure 1:
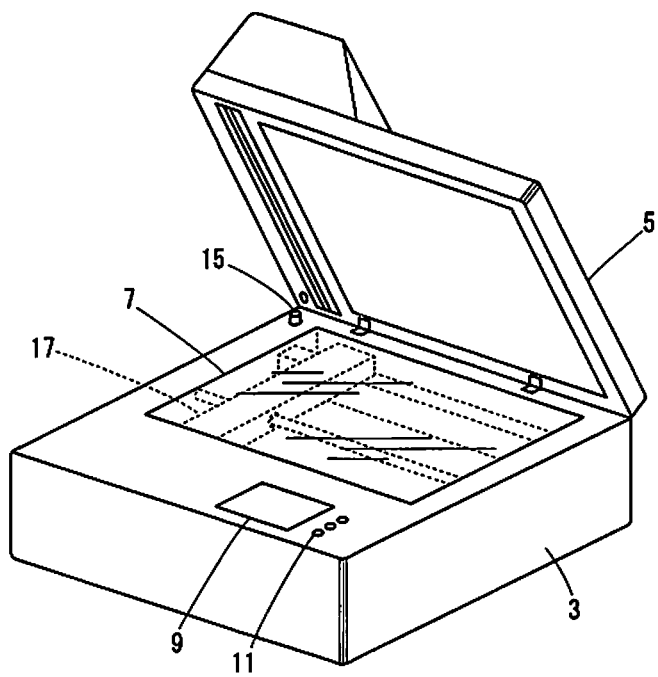
FIG. 1 is a perspective view of an external appearance of a reading apparatus according to an embodiment.
Figure 2:
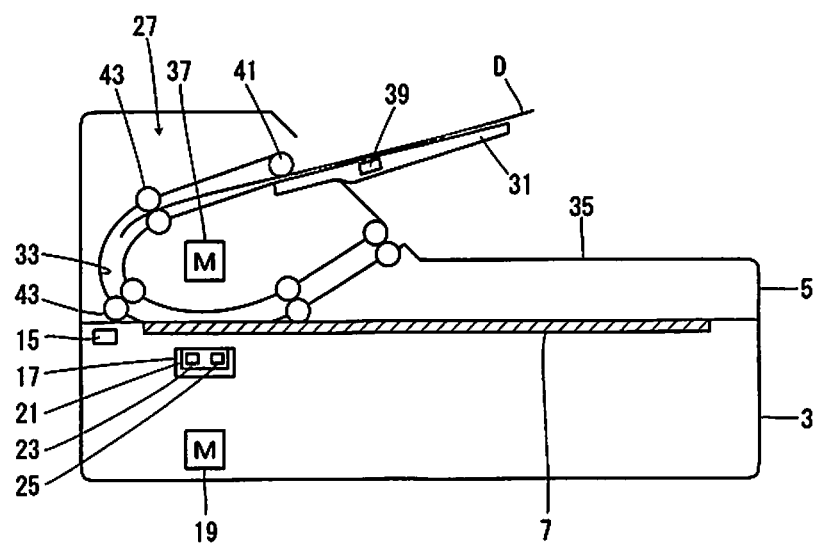
FIG. 2 is a view showing an internal structure of the reading apparatus.

As shown in FIGS. 1 and 2, a reading apparatus 1 includes a body case 3 and an opening and closing cover 5. The body case 3 is formed into a substantially rectangular parallelepiped shape. The opening and closing cover 5 is mounted on the body case 3 so as to rotate an end portion of the opening and closing cover 5 as a fulcrum, and opens and closes a placement portion 7 provided on an upper surface of the body case 3.

A document D is placed on the placement portion 7 by a user. The placement portion 7 is a flat-bed type placement portion, for example, is formed of transparent glass plate.

In addition to the placement portion 7, a touch panel 9, an operation button 11, a cover detection unit 15 are provided on the upper surface of the body case 3. The touch panel 9 displays various screens and receives various operations from the user. The operation button 11 includes, for example, a power button, a menu button, and the like. The cover detection unit 15 outputs different detection signals depending on an open and closed state of the opening and closing cover 5.

A carriage 17 and a carriage motor 19 are provided in the body case 3. The carriage 17 is configured to move reciprocally in a predetermined sub-scanning direction. The carriage 17 is equipped with a reading unit 21. The carriage motor 19 is a driving source for reciprocating the carriage 17 in the sub-scanning direction. The reading unit 21 reads the document D by scanning the document D. The reading unit 21 includes a light source 23 and an image sensor 25. The light source 23 irradiates the document D with light. The image sensor 25 receives the light reflected from the document D, thereby reading an image line by line along a main scanning direction perpendicular to the sub-scanning direction and outputting a reading signal.

An auto document feeder (ADF) 27 is provided in the opening and closing cover 5. The ADF 27 includes a set tray 31, a conveyance path 33, a discharge tray 35, and a conveying motor 37. A document D is set on the set tray 31 by the user. A document detection unit 39 detecting the document D on the set tray 31 is provided on the set tray 31. A supply roller 41 and a plurality of conveying roller pairs 43 are provided on the conveyance path 33. The supply roller 41 supplies the document D set on the set tray 31 to the conveyance path 33. The conveying roller pairs 43 convey the document D supplied by the supply roller 41 toward the discharge tray 35. The conveying motor 37 is a driving source of the supply roller 41 and the conveying roller pairs 43. The ADF 27 automatically conveys a plurality of documents D one by one when the plurality of the documents D are set on the set tray 31.

The reading apparatus 1 configured as described above can execute a conveyance reading mode for reading the document D conveyed by the ADF 27 and a placement reading mode for reading the document D placed on the placement portion 7. That is, the reading apparatus 1 executes the conveyance reading mode by the document detection unit 39 at the time of detecting the document D which is set on the set tray 31 in the ADF 27, and executes the placement reading mode at the time of detecting the document D which is not set on the set tray 31.

Figure 3:
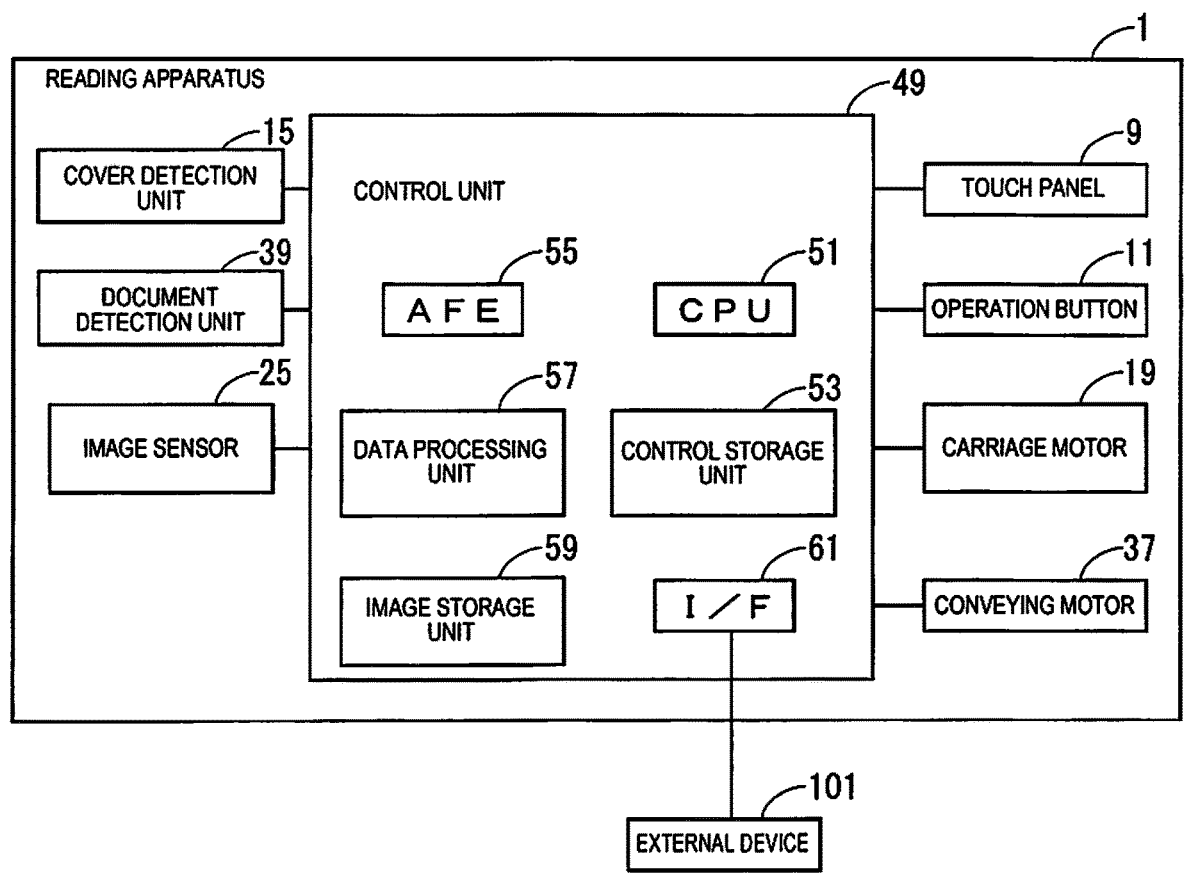
FIG. 3 is a block diagram showing a control configuration of the reading apparatus.

A control configuration of the reading apparatus 1 will be described with reference to FIG. 3. The reading apparatus 1 includes a control unit 49. The control unit 49 includes a central processing unit (CPU) 51, a control storage unit 53, an analog front end (AFE) 55, a data processing unit 57, an image storage unit 59, and an interface 61. The control unit 49 is an example of a computer. The control unit 49 may use ASIC or the like, instead of or in cooperation with the CPU 51. In general, the CPU and the ASIC are referred to as a processor.

The CPU 51 integrally controls the entire of the reading apparatus 1. The control storage unit 53 includes a read only memory (ROM) for storing such as a program, a random access memory (RAM) for temporarily storing such as data and an arithmetic result, and the like. The AFE 55 converts a reading signal which is an analog signal output from the image sensor 25 into a digital signal. The data processing unit 57 performs various types of correction for the digital signal output from the AFE 55 to generate image data of the document D. The image data is RGB data, but is not limited thereto, and for example, the image data may be CMY data. The image storage unit 59 stores the generated image data. For example, a hard disk drive (HDD), a solid state drive (SSD), and the like may be used as the image storage unit 59. The interface 61 outputs the image data to an external device 101. For example, a personal computer, a server device, and the like may be used as the external device 101.

Figure 4:
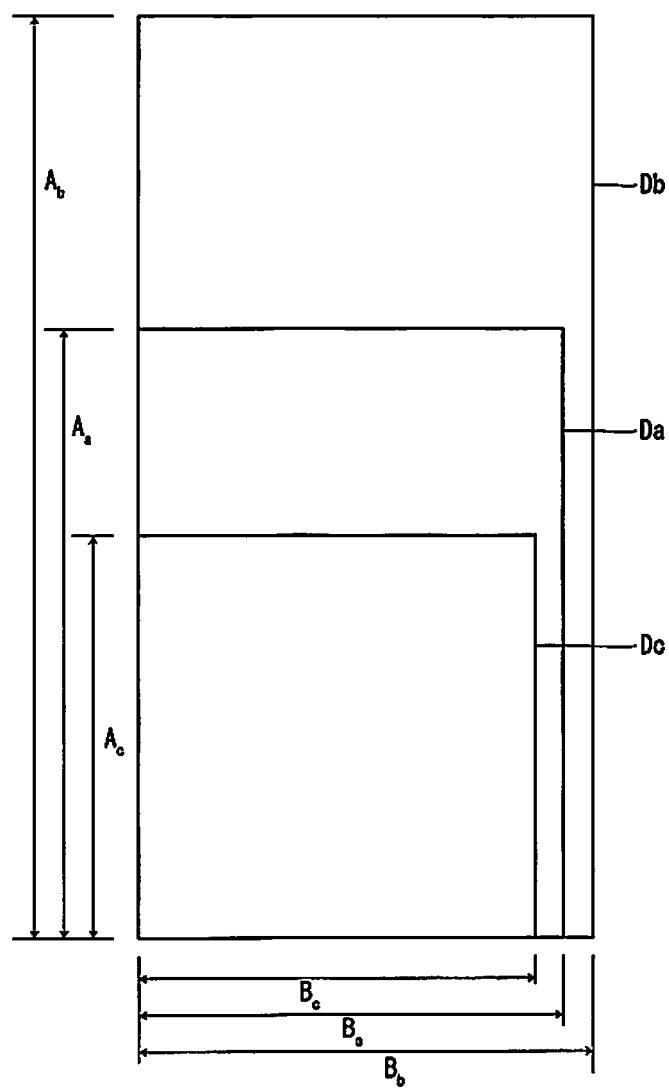
FIG. 4 is a view showing a long document, a lengthy document, and a non-long document.

A long document Da, a lengthy document Db, and a non-long document Dc will be described with reference to FIG. 4. The document D is classified into the long document Da, the lengthy document Db, and the non-long document Dc depending on a document length-to-width ratio r (=P/Q) of a circumscription image 67 (refer to FIG. 5) which has the same inclined circumscribed rectangle as the document image 63 read from the document D. The document length-to-width ratio r is a ratio of a length P of a long side of the circumscription image 67 to a length Q of a short side of the circumscription image 67. Here, the same inclined circumscribed rectangle of the document image 63 means a circumscribed rectangle whose inclinations in the circumscribed rectangles of the document image 63 coincide with a document inclination E (described below). In addition, the circumscribed rectangle of the document image 63 means a rectangle, in which if one side in the rectangles where all points of the vertices and the sides are positioned on the outer side or on the periphery of the document image 63, is moved parallel inward as much as possible, any point on the side thereof is positioned inside of the document image 63.

The long document Da is the document D which has the document length-to-width ratio r of a first document threshold $r_1$ or larger and smaller than a second document threshold $r_2$. Examples of the long document Da may include fixed-size paper such as A4 paper or B5 paper, slip paper, and the like. The lengthy document Db is the document D which has the document length-to-width ratio r of the second document threshold $r_2$ or larger. Examples of the lengthy document Db may include a piece of paper cut from roll paper such as a receipt or a coupon, and the like. The non-long document Dc is the document D which has the document length-to-width ratio r of smaller than the first document threshold $r_1$. Example of the non-long document Dc may include a label, a seal, die-cutting printed matter, and the like.

If the first document threshold $r_1$ is a value larger than 1, it is not particularly limited, but for example, when $r_1$=1.29, the value corresponds to the letter-sized document length-to-width ratio r having the minimum document length-to-width ratio r in the fixed-size paper. If the second document threshold $r_2$ is a value larger than the first document threshold $r_1$, it is not particularly limited, but for example, $r_2$=2. Note that, the document D as described above performs classification using the same inclined circumscribed rectangle. All of the long document Da, the lengthy document Db, and the non-long document Dc are not limited to a rectangular shape, but the shape thereof may be a parallelogram, a trapezoid, a circle, a star, and the like.

Figure 5:
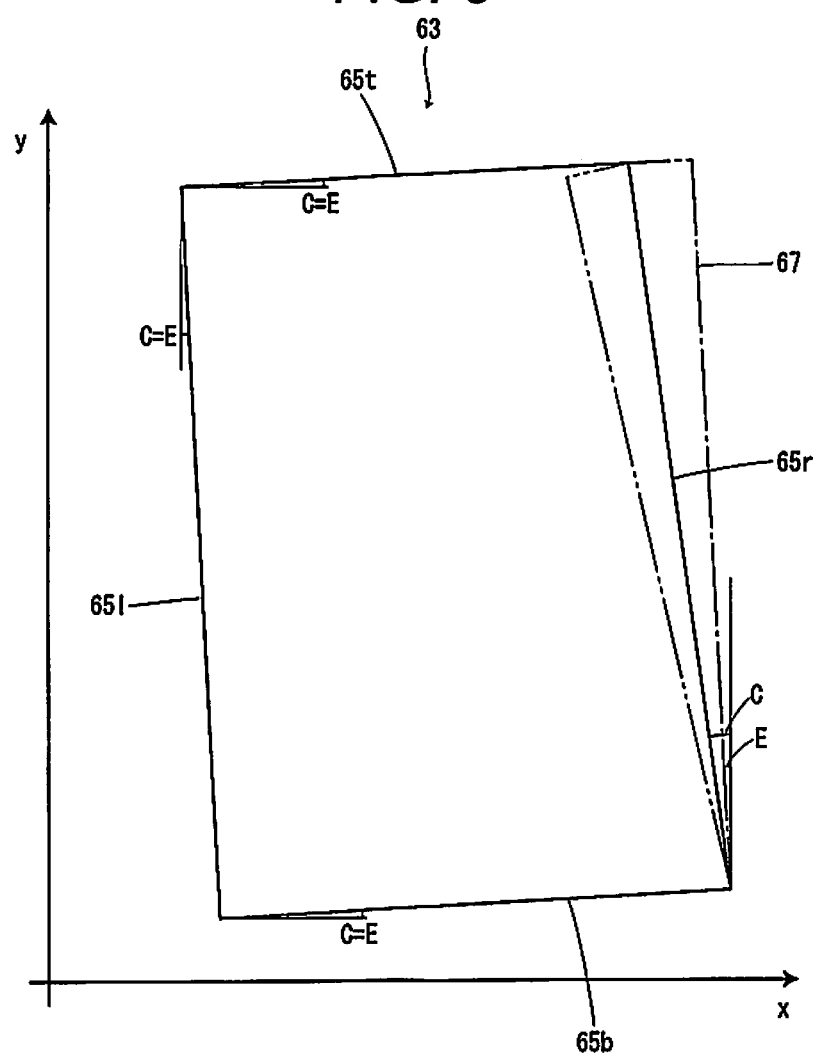
FIG. 5 is a view showing a document image on xy coordinates.

Next, the document image 63, which is read from the document D having a rectangular shape originally but is folded to a right side, will be described as an example. FIG. 5 is a view showing the document image 63 included in the image data on xy coordinates, an x direction corresponds to a main scanning direction, and a y direction corresponds to a sub-scanning direction. The document image 63 includes a top-side image 65t corresponding to a top side of the document D, a bottom-side image 65b corresponding to a bottom side of the document D, a left-side image 65l corresponding to a left side of the document D, and a right-side image 65r corresponding to a right side of the document D. FIG. 5 virtually shows the document image 63 being folded to the right side using two-dotted chain line.

When the user sets the document D on the placement portion 7 or the set tray 31 in an inclined state, the document image 63 read from the document D is inclined with respect to the x direction and the y direction. When the document image 63 is inclined with respect to the x direction and the y direction, it is preferable to perform inclination correction of the document image 63, that is, an image process of rotating the document image 63 based on the document inclination E which is an inclination of the document image 63. Here, the document inclination E is an inclination with the x direction and the y direction as a reference. In addition, as described above, the circumscription image 67 which is the same inclined circumscribed rectangle of the document image 63 is a rectangle circumscribing the document image 63, and means an image of a rectangle in which an inclination of a top side and a bottom side of the document image 63 with respect to the x direction or an inclination of a left side and a right side of the circumscription image 67 with respect to the y direction is the same as the document inclination E.

However, when a side of the document ID is folded or broken as the document image 63 shown in FIG. 5, a side inclination C of a side image 65 is different from the document inclination E which is the inclination of the document image 63. Note that, the side inclination C of the top-side image 65t or the bottom-side image 65b means an inclination with respect to the x direction which is an example of a reference direction, and the side inclination C of the left-side image 65l or the right-side image 65r means an inclination with respect to the y direction which is an example of a reference direction.

When the side inclination C is different from the document inclination E with respect to three sides or more among four sides of the side image 65, the reading apparatus 1 may obtain the document inclination E based on the side image 65 in which the side inclination C is different from the document inclination E by mistake when the inclination correction is performed, and thus the obtained document inclination E becomes smaller in reliability.

As shown in FIG. 6, when the number of side images 65 in which the side inclination C is the same as the document inclination E among the four sides of the side image 65 is 4 or 3, the reading apparatus 1 performs the inclination correction. However, when the number of the side images 65 in which the side inclination C is the same as the document inclination E is 1 or less, the reading apparatus 1 does not perform the inclination correction. In addition, for the lengthy document Db, even when the number of the side images 65 in which the side inclination C is the same as the document inclination E is 2 or less, the reading apparatus 1 performs the inclination correction when in the side image 65 formed of two long sides facing each other and two short sides facing each other, the side inclination C of two long sides facing each other is the same as the document inclination E. Since for the lengthy document Db, a length of the long side of the circumscription image 67 of the document image 63 is overwhelmingly larger than a length of the short side of the circumscription image 67 of the document image 63, the document inclination E is obtained based on the long side of the side image 65. Therefore, if the side inclination C is the same as the document inclination E in the two long sides of the side image 65, the obtained document inclination E becomes higher in reliability.

In the present specification, the fact that the side inclination C is the same as the document inclination E is not limited to the fact that the side inclination C and the document inclination E are exactly the same, but the difference of extent not to disturb the user is to be acceptable. In particular, the reading apparatus 1 determines whether or not the side inclination C of the each side image 65 is the same as the document inclination E depending on whether or not an inclination difference V corresponding to a difference between the side inclination C and the document inclination E is smaller than an inclination difference threshold $V_{th}$, and details thereof will be described below.

Here, when the document D is the long document Da or the lengthy document Db, it is preferable that the inclination difference threshold $V_{th}$ is a relatively large value. Since the long document Da or the lengthy document Db is fixed-size paper, slip paper, a piece of paper of roll paper, and the like as described above and is roughly handled by the user, the sides of the paper are folded and broken in many cases. Therefore, when the inclination difference threshold $V_{th}$ is a small value, for example, when the rectangular long document Da is read, it is determined that the number of the side images 65 in which the side inclination C is the same as the document inclination E is 2 or less even if the sides of the long document Da are slightly folded or broken, this is why the inclination correction may not be performed.

On the other hand, when the document D is the non-long document Dc, it is preferable that the inclination difference threshold $V_{th}$ is a relatively small value. The non-long document Dc is a label, a seal, die-cutting printed matter, and the like as described above, and the original shape thereof is not a rectangle in many cases. Therefore, when the inclination difference threshold $V_{th}$ is a large value, for example, even when the quadrilateral non-long document Dc is set not to be inclined, it is determined that the number of the side images 65 in which the side inclination C is the same as the document inclination E is 4, this is why the inclination correction may be performed against user's expectation. In addition, the non-long document Dc is a label, a seal, die-cutting printed matter, and the like, and is relatively carefully handled by the user, and thus the sides of the paper are less likely to be folded and broken. Therefore, even if the inclination difference threshold $V_{th}$ is a small value, for example, when the square non-long document Dc is read, it is determined that the number of the side images 65 in which the side inclination C is the same as the document inclination E is 4, this is why the inclination correction is performed.

The reading apparatus 1 uses a value monotonously increasing with respect to the document length-to-width ratio r as the inclination difference threshold $V_{th}$ and details thereof will be described below. The monotonous increase means a broadly monotonous increase, that is, means that the inclination difference threshold $V_{th}$ is increased or does not change when the document length-to-width ratio r is increased. However, the monotonous increase means a narrow monotonous increase, that is, means that the inclination difference threshold $V_{th}$ may be increased when the document length-to-width ratio r is increased.

Figure 7:
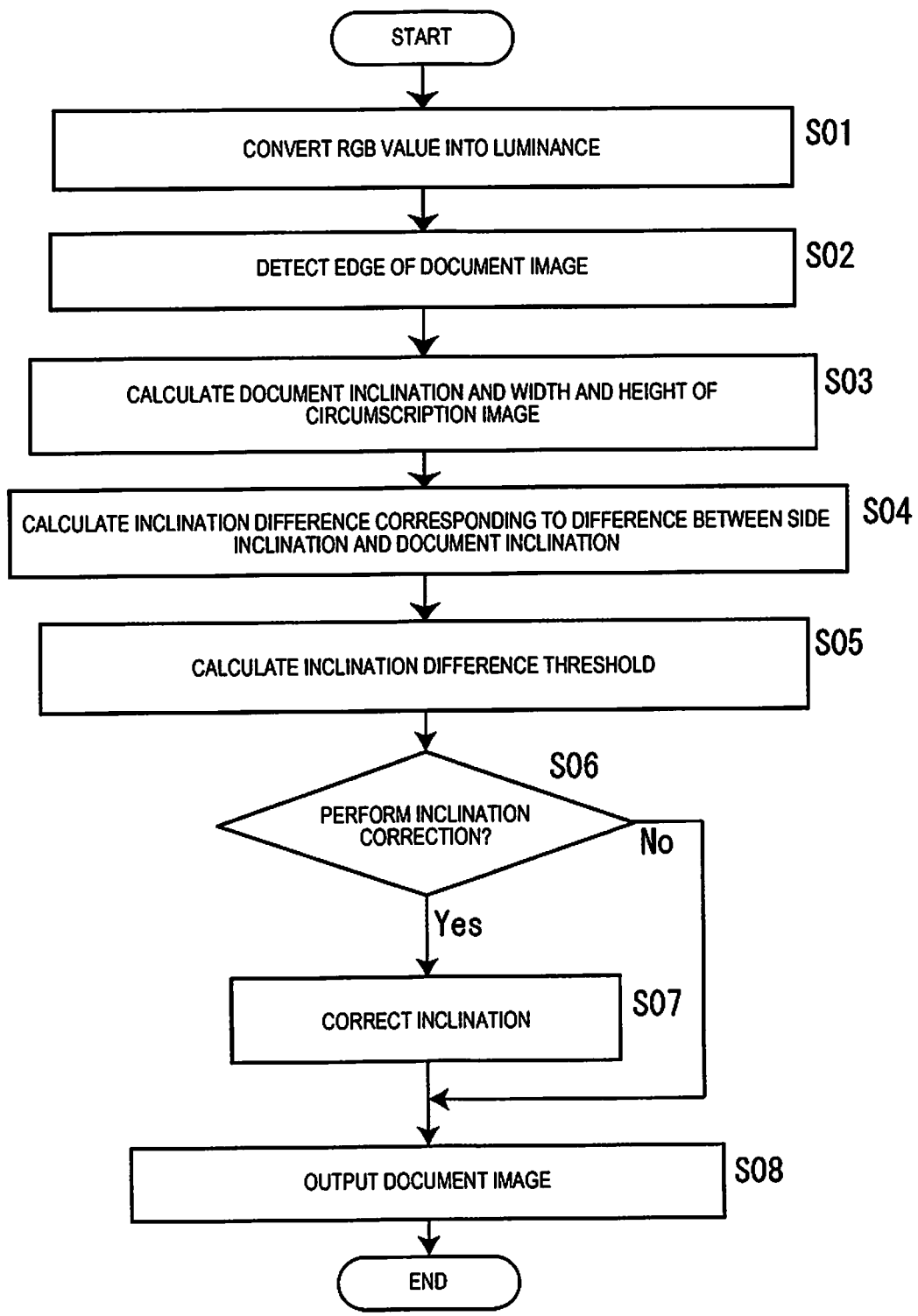
FIG. 7 is a flowchart showing a flow of a control process relating to the inclination correction.

A flow of a control process relating to the inclination correction performed by the control unit 49 will be described with reference to FIG. 7, while referring to FIG. 8. The following control process may be implemented by performing a control program stored in the control storage unit 53 by the CPU 51, but may be implemented only by a hardware.

In Step S01, the control unit 49 converts an RGB value of each pixel of image data obtained from the document D into a luminance Y. For example, the control unit 49 converts the RGB value into the luminance Y based on Equation (1).

$$Y=0.30 \times R+0.59 \times G+0.11 \times B \quad (1)$$

In Step S02, the control unit 49 detects an edge of the document image 63. The edge detection may be performed using a known method, but in the present embodiment, the control unit 49 calculates a luminance difference $\Delta Y$ which is a difference between the luminance Y of a target pixel and the luminance Y of each pixel vertically and horizontally adjacent to the target pixel. Next, when, among four pixels vertically and horizontally adjacent to the target pixel, at least one pixel of which the luminance difference $\Delta Y$ is a luminance difference threshold $\Delta Y$th or larger is present, the control unit 49 determines the target pixel as an edge pixel. When, among four pixels vertically and horizontally adjacent to the target pixel, at least one pixel of which the luminance difference $\Delta Y$ is a luminance difference threshold $\Delta Y$th or larger is not present, the control unit 49 determines the target pixel as a non-edge pixel.

Figure 8:
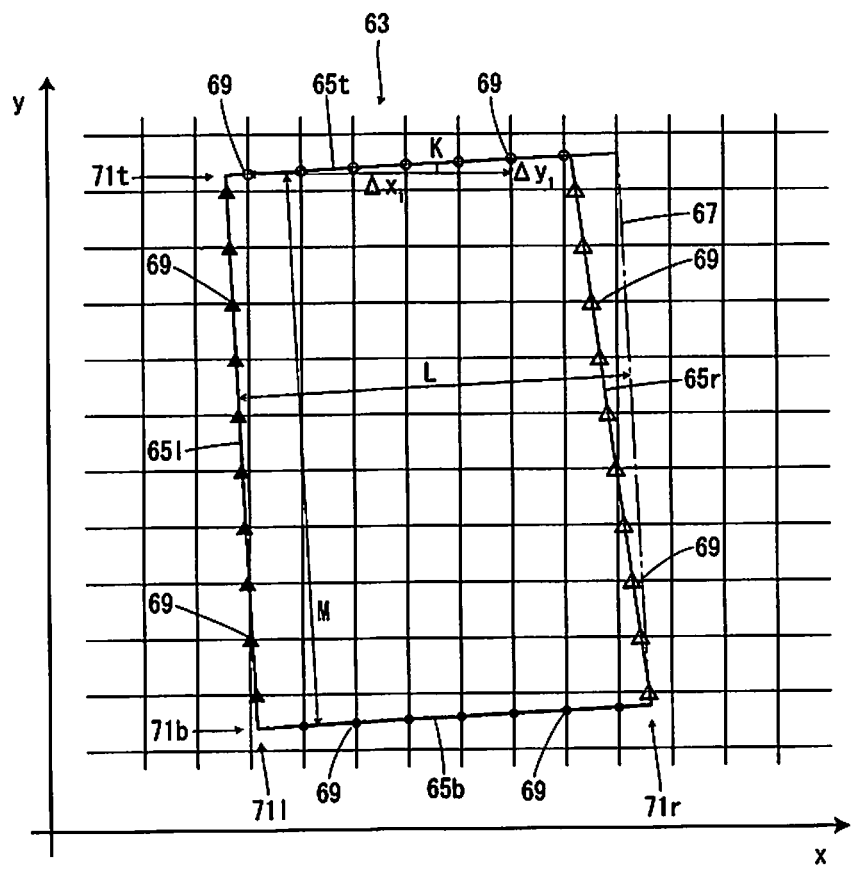
FIG. 8 is a view showing sampling coordinates extracted from the document image.

In Step S03, the control unit 49 calculates the document inclination E, a width L of the circumscription image 67, and a height M of the circumscription image 67 (refer to FIG. 8). As shown in FIG. 8, the control unit 49 searches for an edge pixel from an upper edge to a lower edge of the document image 63 for each pixel row extending in a vertical direction, that is, the x direction first, records coordinates of the first founded edge pixel as a sampling coordinate 69 of the top-side image 65t, and obtains a sampling coordinate group 71t of the top-side image 65t by repeating the searching and the recording. Similarly, the control unit 49 obtains a sampling coordinate group 71b of the bottom-side image 65b, a sampling coordinate group 71l of the left-side image 65l, and a sampling coordinate group 71r of the right-side image 65r. Next, for the top-side image 65t, the control unit 49 obtains a plurality of inclinations K between two points based on a change amount $\Delta x_1$ in the x direction and a change amount $\Delta y_1$ in the y direction of each set of two-point sampling coordinate 69, with respect to all combinations of the sampling coordinate 69 between 2 points in the plurality of sampling coordinates 69 constituting the sampling coordinate group 71t. Similarly, the control unit 49 obtains the plurality of inclinations K between two points for each of the bottom-side image 65b, the left-side image 65l, and the right-side image 65r. Note that, the inclination K between two points of the top-side image 65t and the inclination K between two points of the bottom-side image 65b are given by $\Delta y_1/\Delta x_1$, and the inclination K between two points of the left-side image 65l and the inclination K between two points of the right-side image 65r are given by $\Delta x_1/\Delta y_1$. The control unit 49 sequentially rearranges the plurality of inclinations K between two points obtained for each side image 65 in ascending order along the four sides, and set a center value thereof as the document inclination E.

Next, the control unit 49 obtains coordinates of the circumscription image 67 which is a rectangle circumscribing the sampling coordinate group 71 of each side having the inclination coinciding with the document inclination E, based on the document inclination E and the sampling coordinate group 71 of each side. Next, the control unit 49 obtains the width L of the circumscription image 67 and the height M of the circumscription image 67 based on the coordinates of the circumscription image 67 and the document inclination E. That is, the control unit 49 corrects the coordinates of the circumscription image 67 based on the document inclination E so that each side of the circumscription image 67 is in parallel to the x direction or the y direction. Then, the length of the circumscription image 67 in the x direction after correction is set as the width L, and the length thereof in the y direction is set as the height M.

In Step S04, the control unit 49 calculates the inclination difference V corresponding to the difference between the side inclination C and the document inclination E for each side image 65. The control unit 49 corrects the sampling coordinate group 71t of the top-side image 65t using the document inclination E first, and rearranges each of y coordinates in the plurality of sampling coordinates 69 constituting the corrected sampling coordinate group 71t in ascending order. Next, the control unit 49 obtains an inclination difference Vt of the top-side image 65t based on a change amount $\Delta x_2$ in the x direction and a change amount $\Delta y_2$ in the y direction, with respect to the sampling coordinate 69 between two points of which the y coordinate is in a predetermined order. As described above, the inclination difference Vt can be obtained by obtaining the inclination difference Vt based on the sampling coordinate 69 between two points of which the y coordinate is in a predetermined order, without being affected by unevenness formed on the sides of the document D, such as a perforated line. Similarly, the control unit 49 obtains an inclination difference Vb of the bottom-side image 65b, an inclination difference Vl of the left-side image 65l, and an inclination difference Vr of the right-side image 65r. Note that, similar to the inclination K between two points, the inclination difference Vt of the top-side image 65t and the inclination difference Vb of the bottom-side image 65b are given by $\Delta y_2/\Delta x_2$, and the inclination difference Vl of the left-side image 65l and the inclination difference Vr of the right-side image 65r are given by $\Delta x_2/\Delta y_2$.

In Step S05, the control unit 49 calculates the inclination difference threshold $V_{th}$. First, the control unit 49 compares the width L and the height M of the circumscription image 67 with each other obtained in Step S05 to set a length of the long side as P and a length of the short side as Q. Next, the control unit 49 calculates the document length-to-width ratio r based on Equation (2).

$$r=P/Q \quad (2)$$

Next, the control unit 49 calculates the inclination difference threshold $V_{th}$ based on Equations (3) and (4).

$$\text{In a case of } r \geq r_1, \ V_{th}=V_{thmax} \quad (3)$$

$$\text{In a case of } r < r_1, \ V_{th}=w \times V_{thmax}+(1-w) \times V_{thmin} \quad (4)$$

In Equations (3) and (4), if a value of the maximum inclination difference threshold $V_{thmax}$ and a value of the minimum inclination difference threshold $V_{thmin}$ is $V_{thmax} > V_{thmin}$, it is not particularly limited, but for example, the following values can be taken.

$$V_{thmax}=0.1 \text{ or } 0.121$$

$$V_{thmin}=0.03 \text{ or } 0.029$$

The value of the maximum inclination difference threshold $V_{thmax}$ is determined based on a length (105 mm) of a short side of A6 paper and a general dimension (12.7 mm) of margin in the document D. In addition, the value of the minimum inclination difference threshold $V_{thmin}$ is determined based on the length (105 mm) of the short side of A6 paper and a segmenting accuracy (3 mm) of the document image 63.

In addition, a weight coefficient w in Equation (4) is given by Equation (5).

$$w=(r-r_{min})/(r_1-r_{min}) \quad (5)$$

Here, a value of $r_{min}$ is not particularly limited, but for example, $r_{min}=1$.

In Step S06, the control unit 49 determines whether or not the inclination correction of the document image 63 is performed as follows.

In a case of $r \geq r_2$, the inclination correction is performed when the number of conditions satisfied in conditions 1 to 4 is 3 or more, and the inclination correction is not performed when the number of the conditions satisfied in conditions 1 to 4 is 1 or less. In a case where the number of the conditions satisfied in conditions 1 to 4 is 2, if the conditions 1 and 2 are satisfied when the width L of the circumscription image 67 is set as a long side, the inclination correction is performed, and if the conditions 3 and 4 are satisfied when the height M of the circumscription image 67 is set as a long side, the inclination correction is performed. In the other cases, the inclination correction is not performed.

In a case of $r < r_2$, the inclination correction is performed when the number of the conditions satisfied in conditions 1 to 4 is 3 or more, and the inclination correction is not performed when the number of the conditions satisfied in conditions 1 to 4 is 2 or less.

Condition 1: $V_r \leq V_{th}$

Condition 2: $V_b \leq V_{th}$

Condition 3: $V_l \leq V_{th}$

Condition 4: $V_r \leq V_{th}$

As described above, the control unit 49 determines whether or not the side inclination C of each side image 65 is the same as the document inclination E depending on whether respective Conditions 1 to 4 are satisfied.

When it is determined that the inclination correction of the document image 63 is performed in Step S06, the control unit 49 proceeds to Step S07. When it is determined that the inclination correction of the document image 63 is performed using the document inclination E obtained from Step S03, the control unit 49 proceeds to Step S08. On the other hand, when it is determined that the inclination correction of the document image 63 is not performed in Step S06, the control unit 49 proceeds to Step S08 without performing the inclination correction of the document image 63. The control unit 49 performs an image process such as dust removal in Step S08, and ends the control process after the document image 63 is output.

As described above, when the document length-to-width ratio r is larger than the first document threshold $r_1$, that is, when the document D is the long document Da or the lengthy document Db, the maximum inclination difference threshold $V_{thmax}$ is used as the inclination difference threshold $V_{th}$. As a result, since the inclination difference V of each side image 65 is likely to be smaller than the inclination difference threshold $V_{th}$, the respective conditions 1 to 4 are satisfied, that is, it is determined that the side inclination C is the same as the document inclination E, and thus the inclination correction of the document image 63 is easily performed. Therefore, the inclination correction of the document image 63 can be performed even when the long document Da or the lengthy document Db are folded or broken.

On the other hand, when the document length-to-width ratio r is smaller than the first document threshold $r_1$, that is, when the document D is the non-long document Dc, a value smaller than the maximum inclination difference threshold $V_{thmax}$ is used as the inclination difference threshold $V_{th}$. As a result, since the side inclination C of each side image 65 is likely to be larger than the inclination difference threshold $V_{th}$, the respective conditions 1 to 4 are not satisfied, that is, it is determined that the side inclination C is not the same as the document inclination E, and the inclination correction of the document image 63 is hard to be performed. Therefore, when the non-long document Dc is set not to be inclined, it is possible to suppress that the inclination correction is performed against user's expectation.

In addition, when the document length-to-width ratio r is larger than the second document threshold $r_2$, that is, when the document D is the lengthy document Db, the inclination correction is performed as long as the inclination difference V is smaller than the inclination difference threshold $V_{th}$ with respect to the two long sides facing each other even when only the two conditions of the four conditions are satisfied. Therefore, the inclination correction of the document image 63 can be performed even when, for example, the lengthy document Db is a receipt, the two short sides facing each other are significantly folded or the side separated from roll paper is dirty and broken.

Figure 9:
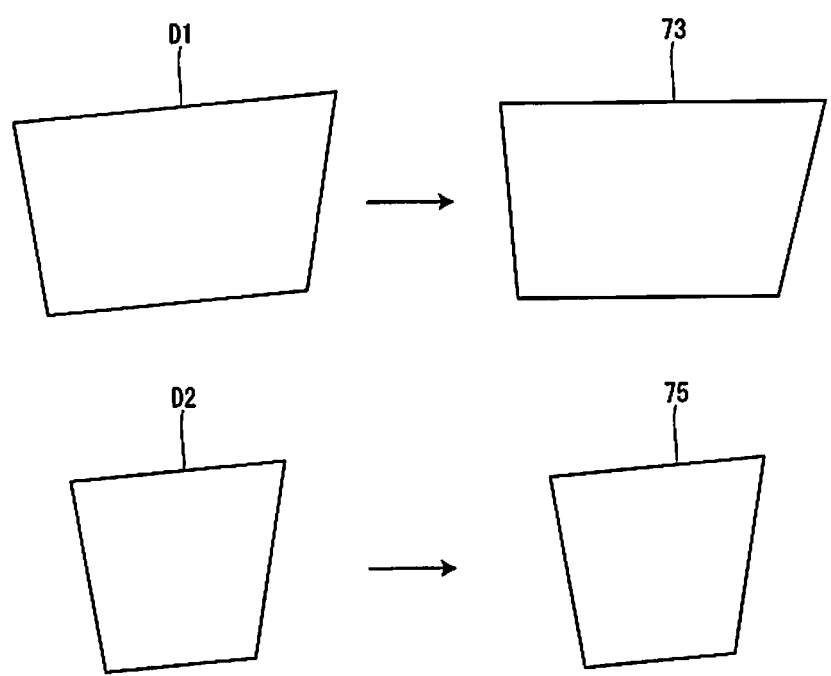
FIG. 9 is a view showing that the inclination correction is performed when a first document is read and the inclination correction is not performed when a second document is read.

In the embodiments described above, even though the document is a quadrangle of which all angles of corresponding vertices coincide with each other, there may be a case in which the inclination correction is automatically performed and a case in which the inclination correction is not automatically performed. In particular, when the reading apparatus 1 reads the first document D1 and the second document D2, respectively, the document image 63 being output will be described with reference to FIG. 9 as an example. The first document D1 is the long document Da, the control unit 49 determines that, in a case of $r < r_2$, the Conditions 1, 2, and 3 are satisfied and the Condition 4 is not satisfied in Step S06 as shown in FIG. 7. Therefore, when the first document D1 is read, the reading apparatus 1 performs inclination correction for a first document image read from the first document D1 to output a first output image 73.

Meanwhile, the second document D2 is the non-long document Dc, and all the angles of vertices corresponding to the first document D1 coincide with each other. However, as described above, since the smaller value is used as the inclination difference threshold $V_{th}$ in a case where the second document D2 is the non-long document Dc than a case where the second document D2 is the long document Da, the control unit 49 determines that, in a case of $r < r_2$, Conditions 1 and 2 are satisfied and Conditions 3 and 4 are not satisfied in Step S06. Therefore, when the second document D2 is read, the reading apparatus 1 does not perform inclination correction for a second document image read from the second document D2 to output a second output image 75.

FIG. 10 shows other examples of the first document D1 and the second document D2. The first document D1 is the lengthy document Db, the control unit 49 determines that, in a case of $r \geq r_2$, when the width L of the circumscription image 67 is set as a long side, Conditions 1 and 2 are satisfied and Conditions 3 and 4 are not satisfied in Step S06. Therefore, when the first document D1 is read, the reading apparatus 1 performs the inclination correction for the first document image read from the first document D1 to output the first output image 73.

Meanwhile, the second document D2 is the long document Da, and all the angles of vertices corresponding to the first document D1 coincide with each other. In a case where the second document D2 is the long document Da, the control unit 49 determines that, in a case of $r < r_2$, Conditions 1 and 2 are satisfied and Conditions 3 and 4 are not satisfied in Step S06. Therefore, when the second document D2 is read, the reading apparatus 1 does not perform inclination correction for a second document image read from the second document D2 to output a second output image 75. In both examples in FIGS. 9 and 10, the first document D1 and the second document D2 are convex rectangles, and in the figures, the top and bottom sides of the first document D1 are longer than those of the second document D2.

Other Modification Examples

The reading apparatus 1 is not limited to the embodiments described above, and it goes without saying that various configurations can be adopted without departing from the scope of the present disclosure. For example, the embodiments described above can be modified into the following aspects in addition to the above.

The control unit 49 may use another circumscribed rectangle such as the minimum circumscribed rectangle which has the smallest area in the circumscribed rectangles of the document image 63 instead of using the same inclined circumscribed rectangle of the document image 63 as the circumscription image 67.

The control unit 49 uses the document length-to-width ratio r as an element for obtaining the inclination difference threshold $V_{th}$, but is not limited to the configuration thereof. For example, when the document length-to-width ratio r is larger than a predetermined value, the control unit 49 performs the inclination correction of the document image 63 depending on the number of the side images 65 in which the inclination difference V is smaller than the inclination difference threshold $V_{th}$. However, when the document length-to-width ratio r is smaller than a predetermined value, the control unit 49 may not perform the inclination correction of the document image 63 regardless of the number of the side images 65 in which the inclination difference V is smaller than the inclination difference threshold $V_{th}$.

The control unit 49 determines that the inclination correction of the document image 63 is performed when the number of the side images 65 in which the inclination difference V is smaller than the inclination difference threshold $V_{th}$ is 3 or more. However, the number used as a determination reference is not limited to 3, but may be an integer of 1 or more. In addition, the control unit 49 may determine that the inclination correction of the document image 63 is performed when the number of the side images 65 in which the inclination difference V is smaller than the inclination difference threshold $V_{th}$ is a predetermined number or less, such as 3.

The reading unit 21 is not limited to a configuration in which the document D is read by scanning the document D, but for example, the camera may function as the reading unit 21.

The reading unit 21 is not limited to a configuration of acquiring the document length-to-width ratio r based on the document image 63, but for example, may be a configuration of acquiring the document length-to-width ratio r based on a size of the document D input from the touch panel 9.

When the inclination correction is not performed, the control unit 49 may allow the user to manually designate a rotation angle to perform the manual inclination correction by rotating at the rotation angle designated by the user.

The control unit 49 performs processes from Step S01 to Step S06 by using an analysis image which is subjected to reduction of the read image to reduce a data amount, and may determine whether or not the inclination correction for the read image is performed.

The order of the inclination correction is not limited when the control unit 49 performs a plurality of image processes for the read image. It is not necessary to continuously perform determination whether or not the inclination correction is performed and the inclination correction at the time of performing the inclination correction, another image process may be performed after the determination is performed, and then the inclination correction may be performed.

The reading apparatus 1 may have a copy function, a facsimile function, and the like in addition to a reading function. That is, a "reading apparatus" means a multifunction peripheral which has a reading function, a copy function, a facsimile function, and the like. In addition, "output" means not only output to an external device as image data, but also display output using a display mechanism and print output using a print mechanism.

A computer including an information processing device in which a control program is installed may function similarly to the control unit 49 of the reading apparatus 1. For example, a personal computer, a smartphone, a tablet terminal, and the like may be used as the information processing device. In this case, the information processing device is not necessary to include a reading unit, and may acquire the document image 63 read from the document D by another device.

The control program may be stored in a non-transitory computer-readable storage medium (CD-ROM, flash memory, and the like) to be provided.

The above-described embodiments and modification examples may be combined with each other.

APPENDIX

Hereinafter, the reading apparatus and a program are added.

A reading apparatus includes: a reading unit reading a document; a determination unit determining whether or not inclination correction of a document image is performed based on a shape of a circumscribed rectangle of the document image read from the document; and an output unit outputting an image subjected to the inclination correction for the document image when it is determined that the inclination correction is performed, and outputting an image not subjected to the inclination correction for the document image when it is determined that the inclination correction is not performed.

A non-transitory computer-readable storage medium storing a program, the program causes a computer to function as: a determination unit determining whether or not inclination correction of a document image is performed based on a shape of a circumscribed rectangle of the document image read from the document by the reading unit; and an output unit outputting an image subjected to the inclination correction for the document image when it is determined that the inclination correction is performed, and outputting an image not subjected to the inclination correction for the document image when it is determined that the inclination correction is not performed.

In this configuration, it is possible to perform the inclination correction of the document image according to the shape of the circumscribed rectangle of the document image when the document image read from the document is not a rectangle.

In this case, when the number of side images in which an inclination difference corresponding to a difference between a document inclination and a side inclination is smaller than an inclination difference threshold is n (n is an integer of 1 or more) or more, the document inclination being an inclination with respect to a reference direction as a reference of the inclination correction of the document image and the side inclination being an inclination with respect to the reference direction of a side image which is a side of the document image, it is determined that the inclination correction of the document image may be performed, and when the number of the side images in which the inclination difference is smaller than the inclination difference threshold is less than n, it is determined that the inclination correction of the document image may not be performed.

In this configuration, it is possible to suppress that the document inclination is obtained with the side image in which the side inclination and document inclination are different from each other as a reference.

In this case, the determination unit may use a value monotonously increasing with respect to the document length-to-width ratio which is a ratio of a length of the long side to a length of the short side of the circumscribed rectangle of the document as the inclination difference threshold.

In this configuration, it is possible to perform the inclination correction of the document image for the document having a large document length-to-width ratio even when the document is folded or broken. Whereas, it is possible to suppress that the erroneous inclination correction is performed for the document having a smaller document length-to-width ratio when the document is set not to be inclined.

In this case, when the determination unit uses n=3 or n=4 as a value of n, and even when the number of side images in which the inclination difference is smaller than the inclination difference threshold is less than n, the determination unit may perform the inclination correction of the document image when in the side images formed of two long sides facing each other and two short sides facing each other, the inclination difference in the two long sides facing each other is smaller than the inclination difference threshold.

In this configuration, it is possible to perform the inclination correction of the document image even when the two short sides facing each other are folded or broken.

A reading apparatus includes a reading unit reading a document and a control unit outputting an output image based on the document image read from the document, wherein the control unit outputs a first output image subjected to correcting an inclination of a first document image read from a first document as the output image when the first document is read, and the control unit outputs a second output image not subjected to correcting an inclination of a second document image read from a second document as the output image when the second document in which all angles of vertices corresponding to the first document coincide with those of the first document and a shape is different from that of the first document is read.

A non-transitory computer-readable storage medium storing a program, the program causes a computer to function as: a control unit outputting an output image based on the document image read from the document by the reading unit, in which the control unit outputs a first output image subjected to correcting an inclination of a first document image read from a first document as the output image when the first document is read, and the control unit outputs a second output image not subjected to correcting an inclination of a second document image read from a second document as the output image when the second document in which all angles of vertices corresponding to the first document coincide with those of the first document and a shape is different from that of the first document is read.

In this configuration, it is possible to switch so that the first output image subjected to the inclination correction is output when the first document is read and the second output image not subjected to the inclination correction is performed when the second document is read.

In this case, the control unit may output the first output image and the second output image when a document length-to-width ratio of a minimum circumscribed rectangle of the second document is smaller than a document length-to-width ratio of a length of a long side to a length of a short side of a minimum circumscribed rectangle of the first document.

In this configuration, it is possible to output the first output image subjected to the inclination correction when the first document having a large document length-to-width ratio is read and output the second output image not subjected to the inclination correction when the second document having a small document length-to-width ratio is read.

In this case, the first document and the second document may be convex rectangles, and two sides of the first document facing each other may be longer than the sides of the second document corresponding to each other.

In this configuration, it is possible to output the first output image subjected to the inclination correction when the first document in which the two sides facing each other are long is read and output the second output image not subjected to the inclination correction when the second document in which the two sides facing each other are short is read.

What is claimed is:

1. A non-transitory computer-readable storage medium storing a program that causes a computer to perform a process, the process comprising:
   specifying a circumscribed rectangle of a document image read from a document by a light source and an image sensor or by a camera;
   determining whether or not inclination correction of the document image is performed based on a shape of the circumscribed rectangle; and
   outputting an image subjected to the inclination correction for the document image when determining that the inclination correction is performed, and outputting an image not subjected to the inclination correction for the document image when determining that the inclination correction is not performed, wherein
   the inclination correction of the document image is performed when the number of side images, in which an inclination difference is smaller than an inclination difference threshold, is n or more, where n is an integer of 1 or more, the side images are sides of the document image, the document inclination is an inclination with respect to a reference direction as a reference of the inclination correction of the document image, the side inclination is an inclination with respect to the reference direction of each of the side images, and the inclination difference corresponds to a difference between the document inclination and the side inclination, and
   the inclination correction of the document image is not performed when the number of the side images, in which the inclination difference is smaller than the inclination difference threshold, is less than n.

2. The non-transitory computer-readable storage medium storing a program according to claim 1, wherein the determining is performed by using a value monotonously increasing with respect to a document length-to-width ratio which is a ratio of a length of a long side to a length of a short side of the circumscribed rectangle of the document as the inclination difference threshold.

3. The non-transitory computer-readable storage medium storing a program according to claim 1, wherein the determining is performed by using n=3 or n=4 as a value of n, and even when the number of the side images, each of which has the inclination difference that is smaller than the inclination difference threshold, is less than n, the determining that the inclination correction of the document image is preformed is performed so long as in the side image formed of two long sides facing each other and two short sides facing each other, the inclination difference of each of the two long sides facing each other is smaller than the inclination difference threshold.

4. A non-transitory computer-readable storage medium storing a program, the program causing a computer to perform a process, the process comprising:

outputting an output image based on a document image read from a document by a light source and an image sensor or by a camera, wherein the outputting is performed by outputting a first output image subjected to correcting an inclination of a first document image read from a first document as the output image when the first document is read, and outputting a second output image not subjected to correcting an inclination of a second document image read from a second document as the output image when the second document in which all angles of vertices corresponding to the first document coincide with those of the first document and a shape is different from that of the first document is read and when two sides of the first document facing each other are longer than two sides of the second document, which correspond to the two sides of the first document.

5. The non-transitory computer-readable storage medium storing a program according to claim 4, wherein the outputting is performed by outputting the first output image and the second output image when a document length-to-width ratio of a minimum circumscribed rectangle of the second document is smaller than a document length-to-width ratio of a length of a long side to a length of a short side of a minimum circumscribed rectangle of the first document.

6. The non-transitory computer-readable storage medium storing a program according to claim 4, wherein the first document and the second document are convex rectangles.

7. A generating method of generating an output image based on a document image read from a document by a light source and an image sensor or by a camera, the method comprising:

reading the document image read from the document by the light source and the image sensor or by the camera; and generating and outputting a first output image subjected to correcting an inclination of a first document image read from a first document as the output image when the read document is the first document, and generating and outputting a second output image not subjected to correcting an inclination of a second document image read from a second document as the output image, when the read document is the second document in which all angles of vertices corresponding to the first document coincide with those of the first document and a shape is different from that of the first document and when two sides of the first document facing each other are longer than two sides of the second document, which correspond to the two sides of the first document.

* * * * *